June 17, 1969  I. BERLIN  3,450,974

SOLID STATE MOTOR CONTROL

Filed Feb. 6, 1967

INVENTOR
IRVING BERLIN
BY Arthur M. Sloan
ATTORNEY

United States Patent Office 3,450,974
Patented June 17, 1969

3,450,974
SOLID STATE MOTOR CONTROL
Irving Berlin, 2407 Connecticut Lane,
Dallas, Tex. 75214
Filed Feb. 6, 1967, Ser. No. 614,091
Int. Cl. H02p 5/06; H02k 27/20
U.S. Cl. 318—331          6 Claims

ABSTRACT OF THE DISCLOSURE

An apparatus for controlling the speed of motor driven tools through the use of proportional power control. Variable control is provided for unidirectional power supplied through a half-wave silicon controlled rectifier to a rotating machine which has substantial inductance.

---

The invention does not "cog" or "cycle-skip" at low speeds and thus provides much greater useable speed range than prior art controls from a few r.p.m. to maximum half-wave speed of the motor. In addition the invention has a more uniform "feedback" response than prior art controls.

In many industrial and commercial tool applications, it is often desirable to control the speed of operation. This is necessary in drill presses, bench lathes, and hand tools such as drills, jig saws, and electrically operated screwdrivers.

There are several well-known methods available for controlling the speed of motor driven tools. One of the more common methods is to lower the speed through gear reduction. Another way is through the use of a rheostat in series with the motor. These prior art methods are either costly, bulky or inefficient. A better way to control motor speed is through the use of proportional power control in accordance with this invention.

Before the advent of semiconductors, vacuum tube thyratrons were used to achieve proportional control in speed control systems. These vacuum tubes had relatively short lifetimes and used excessive power.

Semiconductors, and thyristors in particular are efficient, have relatively long lifetimes and are economically suitable for use in proportional power control systems.

Operation of the thyristor family of semiconductor devices is described in a number of readily available sources in the literature. One recommended reference is "Semiconductor Controlled Rectifiers" by Gentry et al., published by Prentice-Hall, 1964. Only such description of the operation of thyristors as is required for the understanding of the control system of this invention will be given in this disclosure.

This invention relates generally to circuits using a thyristor which is commonly referred to as a silicon controlled rectifier or SCR. More specifically this invention relates to SCR's energized from an alternating current source and supplying power to an inductive load. This invention is specially adapted to circuits which use a single phase half-wave SCR delivering a unidirectional current to an inductive load.

This invention has application to the variable control of unidirectional power supplied through a half-wave SCR to a rotating machine which has substantial inductance such as a series wound or universal motor, the field winding of the generator of a Ward Leonard type variable speed drive, the excitation winding of an eddy current or hysteresis clutch or coupling, or in some cases the field or armature of a separately excited motor.

One object of the invention is to provide a simple control system which permits the use of a single SCR for supplying both the armature and field of the motor.

Another object of the invention is to provide a wide range of control of both the armature and field voltages of the motor to enable the motor speed to be adjusted over a wide range.

A further object of the invention is to provide such a system which enables the speed of the motor to be controlled in such a manner as to remain substantially constant at a selected value irrespective of fluctuations in the load on the motor.

With the above and other objects in view as will hereinafter appear, the invention comprises the devices, combinations and arrangements of parts hereinafter set forth and illustrated in the accompanying drawings of a preferred embodiment of the invention, from which the several features of the invention and the advantages derived therefrom, will be readily understood by those skilled in the art.

Figure 1:
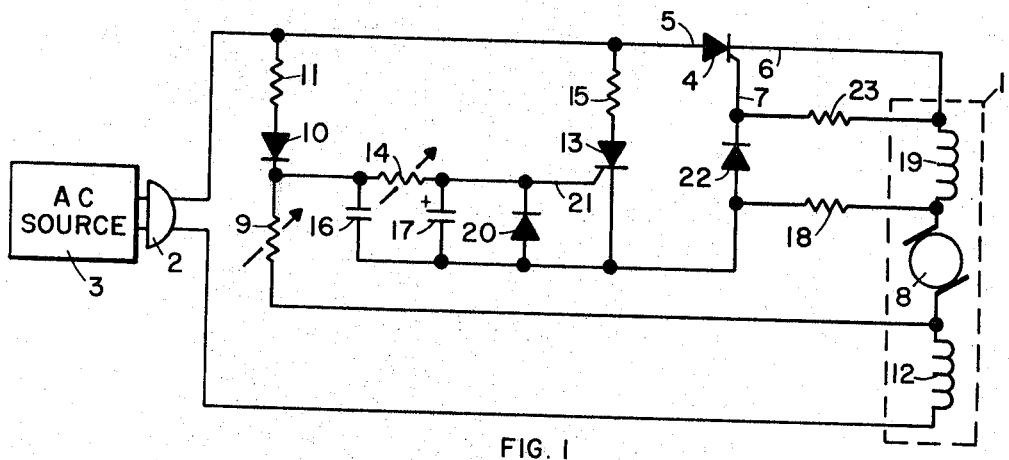
FIGURE 1 is a schematic arrangement of an electrical circuit embodying the features of the invention.

The circuit of FIGURE 1 provides a means for controlling voltage to a motor load and thereby of controlling the speed of a series or universal motor.

The circuit of FIGURE 1 operates as follows:

With the motor 1 at a standstill the plug 2 is connected to alternating current source 3. In order for operation of the motor 1 to commence SCR 4 must be triggered ON. The triggering ON of SCR 4 can only occur when the voltage on the anode 5 of SCR 4 is positive with respect to the cathode 6 of SCR 4. Therefore, the circuit can only operate every positive half cycle delivering power to the motor load.

In addition for the SCR 4 to be triggered ON and the operation of the motor 1 to commence, the voltage to the gate electrode 7 must also be positive with respect to the cathode 6 and of sufficient magnitude to fire the SCR 4.

The speed of the motor 1 is determined by the voltage across the motor armature 8 which in turn is determined by the portion of the positive half cycle that the SCR 4 is conductive. The conduction period and firing angle of the SCR 4 are determined by the magnitude and polarity of the voltage applied to the SCR 4 through the gate electrode 7.

The speed setting reference voltage is provided by connecting one end of a potentiometer 9 in series with a blocking rectifier 10 and resistor 11. The potentiometer 9 is connected at its other end between the motor armature 8 and the field winding 12. Since the blocking rectifier 10 has the same polarity as SCR 4 and SCR 13, the speed setting voltage or gate voltage is of the same half cycle as that of the motor 1.

In addition to the reference function supplied by the network leg which includes resistor 11, rectifier 10, and potentiometer 9 through field 12, a comparator bridging effect is achieved by isolating potentiometer 9 from the A.C. line. As a result a more precise "feedback resultant" is obtained. This is aided by the field 12 acting as a choke to suppress spurious signals from interfering with the reference voltage.

The reference voltage is applied to the gate of SCR 13 through potentiometer 14 which is connected at one end between the cathode of blocking rectifier 10 and potentiometer 9.

Resistor 11, potentiometer 9, resistor 15, potentiometer 14, capacitor 16 and capacitor 17 constitute a phase shaft network which controls the conduction period and firing angle of SCR 13.

Many standard references are available which discuss "Phase Control," see pp. 214–216 and 245 of "Semiconductor Controlled Rectifiers" by Gentry et al. referred to herein supra for a discussion of phase shift networks of the type used in this invention.

The elements used to achieve "Phase Control" are commonly referred to as "Phase Shift Circuits." The passive portions of these "Phase Shift Circuits" are commonly referred to as "Phase Shift Networks."

The simplest form of phase control is the half-wave control utilizing a single SCR to control a resultant unidirectional current flow.

The major portion of the phase shift network which accounts for the greatest angle of shift includes the following elements: resistor 11, potentiometer 9, and capacitor 17. Potentiometer 14 and capacitor 16 come into effect only when a short "ON" time is desired for the control. Potentiometer 14 is set for the resistance necessary to minimize the loading effect on resistor 11, potentiometer 9, and capacitor 17.

Resistor 15 is a part of the phase shift network, as stated, but becomes operative as a current limiting resistor for SCR 13 after SCR 13 is fired.

Figure 2:
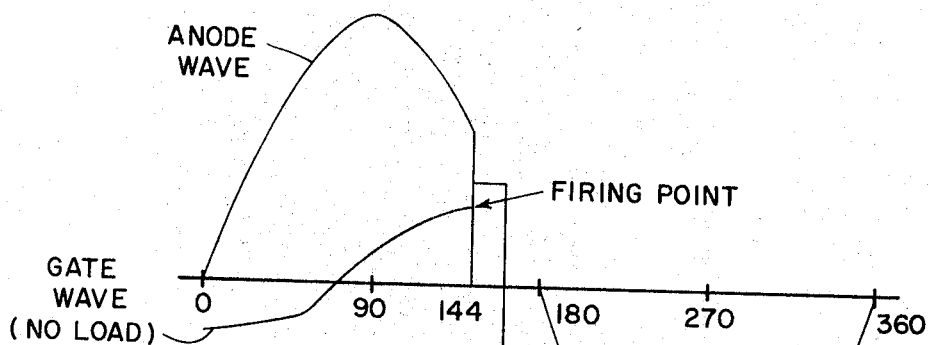
FIGURE 2 is an illustrative waveform which shows the operation of the invention with magnitude of voltage plotted vertically and time plotted horizontally.
Figure 3:
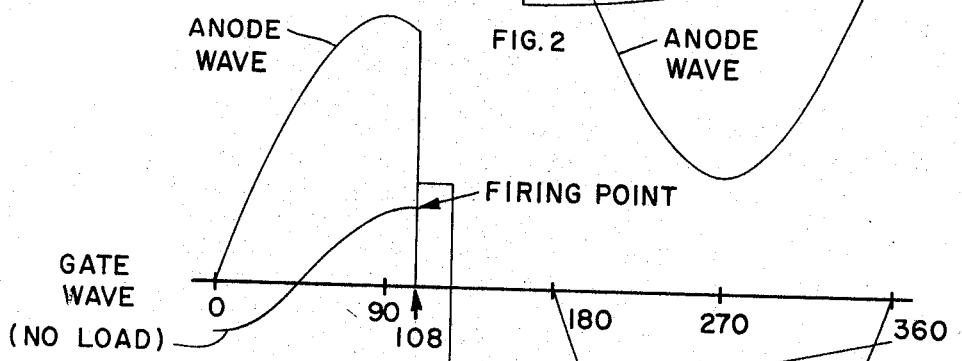
FIGURE 3 is another illustrative waveform to show the operation of the invention with magnitude of voltage plotted vertically and time plotted horizontally.

The voltage supplied to the gate of SCR 13 will be shifted in its phase relationship to the anode voltage in such a manner that positive gate current sufficient to "trigger" or "fire" SCR 13 can be delayed beyond the peak of the anode voltage wave (note FIG. 2 where the SCR is fired 54° beyond the peak and FIG. 3 where the SCR is fired 28° beyond the anode peak).

When the SCR 13 anode voltage swings positive, the capacitors 16 and 17 will start to charge from the "0" degree point (FIGS. 2 and 3). This is illustrated by the "GATE WAVE." These capacitors receive their charge through resistor 11 and potentiometer 9. Capacitor 16 charges quickly as it is small in value, and then capacitor 17 starts charging through potentiometer 14. The voltage across the capacitor 17 will be the time integral of the current $i_c$ admitted to it through the total preceding resistance (resistor 11, potentiometers 9 and 14) $R_T$.

When the capacitor voltage (capacitors 16 and 17) $V_C = V_{GT}$ (gate voltage necessary to "fire" the SCR), the SCR 13 will trigger. Since the voltage $V_C$ can be considered constant when the SCR fires, the $I_{GT}$ (minimum gate current to fire) must be instantaneously supplied through $R_T$. Therefore, limiting the maximum value of $R_T$ to:

$$R_T \leq \frac{e - V_{GT}}{I_{GT}}$$

where $e$=instantaneous supply voltage at which the SCR will trigger.

When considering feedback the above conditions apply except that the SCR 13 will fire earlier in the cycle as is shown in FIG. 3. As can clearly be seen, the capacitor charges earlier in the cycle and as a result, attains $V_C = V_{GT}$ earlier.

When SCR 13 fires, it acts as a "trigger" and enables SCR 4 to fire also, thereby permitting voltage to appear across the motor 1.

SCR 13 fires when the voltage on capacitor 17 reaches the minimum gate voltage to trigger the unit. (This minimum gate voltage is normally 0.45 to 0.60 v.).

The capacitor voltage is the resultant of the feedback voltages derived through resistor 18 from the junction of field 19 and the motor armature 8 and a small alternating current voltage which lags the supply voltage by approximately 90 degrees. The small A.C. voltage is the reference voltage. The feedback voltage is filtered by capacitor 17 to form a direct current voltage level which determines the firing angle of SCR 13 (see FIGURE 2).

Capacitor 16 provides additional phase shift to ensure that the voltage present across capacitor 17 lags by a full 90 degrees. This will provide smooth motor operation at low speeds. Capaictor 17 also acts as a "memory" of the voltages existing during the preceding power half cycle, during which the speed was sensed by the ratio of armature to field voltages.

If the motor is not saturated, its field flux is proportional to field current and also to field voltage. The BACK EMF of the armature is proportional to field flux multiplied by speed. Therefore if ratio of BACK EMF to field voltage is constant, the motor speed will remain constant.

Therefore the "armature voltage" is the "BACK EMF" to field voltage ratio. Any deviations in motor loading would tend to result in speed change. However by the capacitor charging earlier in the cycle, the speed change will therefore be "sensed" and cause the ratio of BACK EMF to field voltage to remain constant by delivering more power to the motor.

Potentiometer 14 is a trimmer resistor so that its resistance value can be adjusted to allow for production variations in the capacitor 17 and in the gate firing voltage and current of SCR 13.

Diode 20 clamps the reverse voltage on the gate electrode 21 to a value equaling the forward voltage drop of the diode 20 (approximately 0.35 volt) to protect the gate electrode 21.

Diode 22 acts to reduce the negative or reverse voltage applied to the gate electrode 7 to protect the gate electrode 7 from excessive reverse voltages when the SCR 4 is triggered into conduction. Resistor 23 may be dispensed with. The purpose of resistor 23 is to lower the input impedance of the gate circuit to stabilize the circuit and render it less sensitive to triggering from random noise voltage.

FIGURE 2 illustrates the gate and anode slow speed waveforms present on SCR 13 depicting the SCR 13 firing late in the half cycle and thus delivering less voltage to the motor load.

FIGURE 3 illustrates the gate and anode fast speed waveforms present on SCR 13 depicting the SCR 13 firing earlier in the half-cycle.

To further clarify the operation, of the invention, the motor 1 will be "OFF" until D.C. or A.C. voltage is applied to it. In this invention a half-wave or rectified pulsating D.C. voltage is available for the motor 1. When SCR 4 is turned "ON" the motor 1 will turn "ON." The speed of motor 1 is determined by the voltage across armature 8 which in turn is determined by the portions of the positive half cycle that the SCR 4 is conductive. This conduction period is determined by magnitude and polarity of the voltage applied to the SCR 4 through the gate electrode 7 and the firing angle of the SCR 4 is determined by the point-in-time when the minimum $V_{GT}$ and $I_{GT}$ of SCR 4 is reached. Therefore, more or less voltage is delivered to the motor depending on the phase angle of SCR 4.

For the purposes of this discussion let us assume an initial "OFF" condition with no voltage to the motor. Therefore both SCR 4 and SCR 13 would be in high impedance states, "blocking voltage."

When an A.C. source 3 is made available to plug 2, a voltage potential will exist across SCR 4, however the motor 1 will not run as SCR 4 will continue to be "OFF." A voltage potential will start to build up across capacitors 16 and 17. When the voltage at the gate electrode 21 reaches the positive magnitude necessary to "fire" SCR 13, then SCR 13 switches to a low impedance state and current will flow through SCR 13. This current will be limited by resistor 15 to prevent damage to SCR 13.

This voltage will be rectified by rectifier 22 and be present at gate electrode 7 of SCR 4, turning SCR 4 to a low impedance state and allowing voltage across the armature 8 of the motor. The duration of this voltage at regular intervals of time (every positive half cycle) will maintain equilibrium speed on motor 1.

What I claim as new and desire to secure by Letters Patent of the United States is:

1. A solid state motor control which enables the speed of a motor to be controlled to remain substantially constant at a selected value regardless of fluctuations in the load on the motor, including a silicon controlled rectifier which is energized by an alternating current source for supplying power to both the armature and field of the motor, said motor having first and second field windings, means to trigger the silicon controlled rectifier ON to operate the motor, and means for determining the conduction period and firing angle of the silicon controlled rectifier to control the speed of the motor, in which the means for triggering the silicon controlled rectifier ON includes a second silicon controlled rectifier and the means for determining the conduction period and firing angle is a phase shift network which controls the conduction period and firing angle of the second silicon controlled rectifier, the phase shift network including a first resistor connected between the anode of the second silicon controlled rectifier and a line running from the anode of the first silicon controlled rectifier for connection to an alternating current source, a first potentiometer connected at one end between the armature of the motor to be controlled and the first of the motor field windings, a second resistor connected at one end to the line from the anode of the second silicon controlled rectifier and at its other end to the other end of the first potentiometer, a second potentiometer connected at one end to the gate electrode of the second silicon controlled rectifier and at its other end between the first potentiometer and the second resistor, a first capacitor connected at one end to a line connected between the armature of the motor to be controlled and the second motor field winding, and at its other end to the line extending from the second potentiometer to a point between the first potentiometer and the second resistor, and a second capacitor connected at one end to the line from the first capacitor connected between the armature and second motor field winding and at its other end to the line from the second potentiometer to the gate electrode of the second silicon controlled rectifier, and wherein the cathode electrode of the second silicon controlled rectifier and the gate electrode of the first silicon controlled rectifier are each connected to the line from the first capacitor connected between the armature and second motor field winding, the cathode of the first silicon controlled rectifier is connected to the end of the second motor field winding remote from the armature of the motor to be controlled, and the end of the first motor field winding is provided with means for connection to an alternating current source.

2. A solid state motor control as described in claim 1 including a diode which acts as a blocking rectifier having its cathode connected to the connection of the first potentiometer and the second potentiometer and having its anode connected to the second resistor, said diode having the same polarity as the first and second silicon controlled rectifiers so that the speed setting reference voltage is of the same half cycle as that of the motor to be controlled.

3. A solid state motor control as described in claim 2 including a diode having its cathode electrode connected to the gate electrode of the first silicon controlled rectifier and its anode electrode connected to the line from the first capacitor connected between the armature and second motor field winding, wherein said anode limits the reverse voltage on the gate electrode to a value equalling the forward voltage drop of the diode to protect the gate electrode by the first silicon controlled rectifier.

4. A solid state motor control as described in claim 2 including a diode having its cathode electrode connected to the gate electrode of the second silicon controlled rectifier and its anode electrode connected to the line from the first capacitor connected between the armature and second motor field winding wherein said diode limits the reverse voltage on the gate electrode to a value equalling the forward voltage drop of the diode to protect the gate electrode of the second silicon controlled rectifier.

5. A solid state motor control as described in claim 2 including a resistor connected at one end to the gate electrode of the first silicon controlled rectifier and at its other end between the cathode electrode of the first silicon controlled rectifier and the end of the second field motor winding remote from the armature of the motor to be controlled, said resistor acting to lower the input impedance of the gate electrode to render it less sensitive to triggering from random noise voltage.

6. A solid state motor control as described in claim 3 including a resistor connected at one end to the anode of the diode connected to the gate electrode of the first silicon controlled rectifier and at its other end between the armature of the motor to be controlled and the second motor field winding, the feedback voltage being derived through said resistor.

References Cited
UNITED STATES PATENTS 3,278,821 10/1966 Gutzwiller _____ 318—331
3,377,536 4/1968 Bacquart _____ 318—331 XR ORIS L. RADER, *Primary Examiner.*

ROBERT J. HICKEY, *Assistant Examiner.*

U.S. Cl. X.R.
318—341